United States Patent [19]
Bresson

[11] Patent Number: 4,469,423
[45] Date of Patent: Sep. 4, 1984

[54] FILM LIGHT SHIELD
[75] Inventor: Richard J. Bresson, Hamlin, N.Y.
[73] Assignee: Eastman Kodak Company, Rochester, N.Y.
[21] Appl. No.: 456,682
[22] Filed: Jan. 10, 1983
[51] Int. Cl.[3] ............................................. G03B 17/02
[52] U.S. Cl. ...................................... 354/288; 354/202
[58] Field of Search ............... 354/202, 217, 218, 288, 354/289.1

[56] References Cited
U.S. PATENT DOCUMENTS

| | | | |
|---|---|---|---|
| 2,132,696 | 5/1937 | Nagel | 224/217 |
| 2,243,460 | 4/1939 | Fischer | 354/288 |
| 2,326,870 | 4/1939 | Lessler | 354/288 |
| 3,339,472 | 9/1967 | Leitz | 354/202 |
| 3,924,940 | 12/1975 | Scibilia | 352/75 |
| 4,384,780 | 5/1983 | Bresson | 354/288 |

Primary Examiner—John Gonzales
Attorney, Agent, or Firm—Roger A. Fields

[57] ABSTRACT

The back of a camera has a window through which an information area on a film cartridge may be viewed. One of the ends of an elastic opaque strip is connected to the camera back at a location between the window and a film pressure plate supported on the camera back. When the other end of the strip is moved to draw the strip taut, partially about the cartridge, the strip transversely shifts against the cartridge and positions an opening in the strip, aligned with the window, over the information area on the cartridge. The strip thus forms a light-tight connection between the camera back and the cartridge, which prevents light entering the window from fogging film advanced out of the cartridge.

7 Claims, 6 Drawing Figures

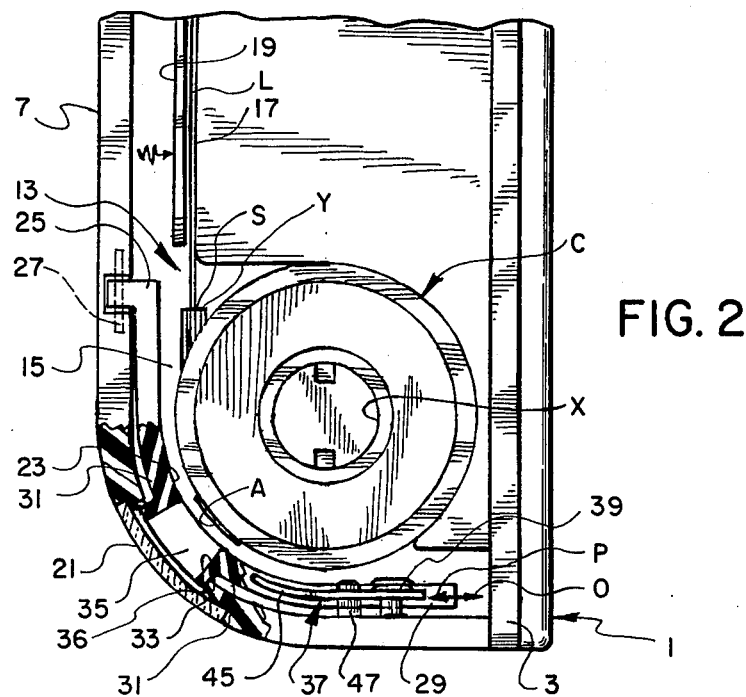

FILM LIGHT SHIELD

CROSS-REFERENCE TO A RELATED APPLICATION

Reference is made to commonly assigned U.S. patent application Ser. No. 355,789, now U.S. Pat. No. 4,384,780 entitled LIGHT SEAL APPARATUS FOR A WINDOW IN A CAMERA BACK and filed on Mar. 8, 1982 in the name of Richard J. Bresson.

BACKGROUND OF THE INVENTION

1. Field of the Invention

The invention generally relates to photographic cameras having a window through which information on a film cartridge may be viewed. More particularly, the invention relates to a light shield for preventing light entering the window from reaching film advanced out of the cartridge.

2. Description of the Prior Art

It is well known to provide a window in the back of a camera for viewing film-related information on a cartridge or the opaque backing of film in the cartridge. In many 126 and 110 size cameras, the window is located in a back door, opposite an opening in the bridge portion of the cartridge connecting the film supply and take-up chambers of the cartridge. When the film is advanced along the bridge portion from the supply chamber to the take-up chamber, exposure numbers on the opaque backing of the film are successively visible at the opening and may be viewed through the window. However, the emulsion side of a film section in the bridge portion must be shielded from light entering the window. This shielding should be done without covering the opening in the bridge portion and, typically, is by a labyrinth light-trap composed of elongate side walls on the bridge portion and mating wall structure on the inside of the camera.

In 35 mm cameras, the film is advanced out of a light-trapped slot in the cartridge and onto a rotatable take-up core. After exposure, the film usually has to be rewound into the cartridge before the cartridge is removed from the camera. Those 35 mm cameras having a window in the back door, such as the Fujica cameras, manufactured by Fuji Photo Company, accomplish light-shielding somewhat differently than in 126 and 110 size cameras. Such 35 mm cameras include a black sponge-like rubber light seal disposed about the window on the inside of the back door. When the door is closed, the window is located opposite the cartridge to view film-related information on the cartridge, and the light seal is compressed between the cartridge and the back door to prevent light entering the window from reaching the film advanced out of the cartridge.

My invention allows film-related information on the cartridge or the film backing to be viewed through the window, but may be embodied in a camera having a bottom door that opens to load and unload the cartridge. This is in contrast to the cameras described above, which use a back door for cartridge-loading and unloading. In general, the bottom-loading cameras of which I am aware do not have a window in the camera body for viewing film-related information on the cartridge or the film backing. Rather, these cameras usually include exterior means for displaying such information, which is mechanically or electronically obtained by sensing indicia on the film or the cartridge.

SUMMARY OF THE INVENTION

According to my invention, there is provided novel light shielding apparatus in a photographic camera of the type adapted to receive a film cartridge having a visible film-related information area. Specifically, the invention comprises, in combination:

- a camera back having a window for viewing the information area;
- means, such as a pressure plate, connected to the camera back for supporting film advanced out of the cartridge;
- a light-blocking member, the member including one portion secured to the camera back at a location between the window and the film supporting means and another portion movable against the cartridge; and
- means for moving the other portion against the cartridge at a location between its information area and the film, whereby the light-blocking member connects the camera back and the cartridge to prevent light entering the window from reaching the film.

In a preferred embodiment of the invention, the camera has a bottom door that opens for cartridge-loading and unloading. The light-blocking member comprises an elastic opaque strip having one end fixed to the camera back at a location between the window and a pressure plate and another end coupled to the bottom door for movement by opening and closing the door. An elongate intermediate portion of the strip has an opening aligned with the window. When the bottom door is closed, the movable end of the strip is moved in a first direction to draw the strip taut partially about a film cartridge in the camera. The intermediate portion of the strip transversely shifts against the cartridge, positioning the opening over the information area of the cartridge and effecting a light-tight connection between the cartridge and the camera back. When the bottom door is opened, the movable end of the strip is moved in a second direction, relaxing the strip and transversely shifting its intermediate portion from the cartridge to facilitate cartridge-unloading.

BRIEF DESCRIPTION OF THE DRAWINGS

FIG. 2 is a bottom plan view of light shielding apparatus in the camera according to a preferred embodiment of the invention, depicting the components of such apparatus in relative positions during cartridge-loading;

FIG. 3 is a side elevation view of the light shielding apparatus as depicted in FIG. 2;

DESCRIPTION OF THE PREFERRED EMBODIMENT

The invention is described as being embodied in a 35 mm camera. Because the details of such cameras are well known, this description will be directed in particular to those elements forming part of or cooperating directly with the preferred embodiment. It is to be understood, however, that other elements not specifically shown or described may take various forms known to persons of ordinary skill in the camera art.

Figure 1:
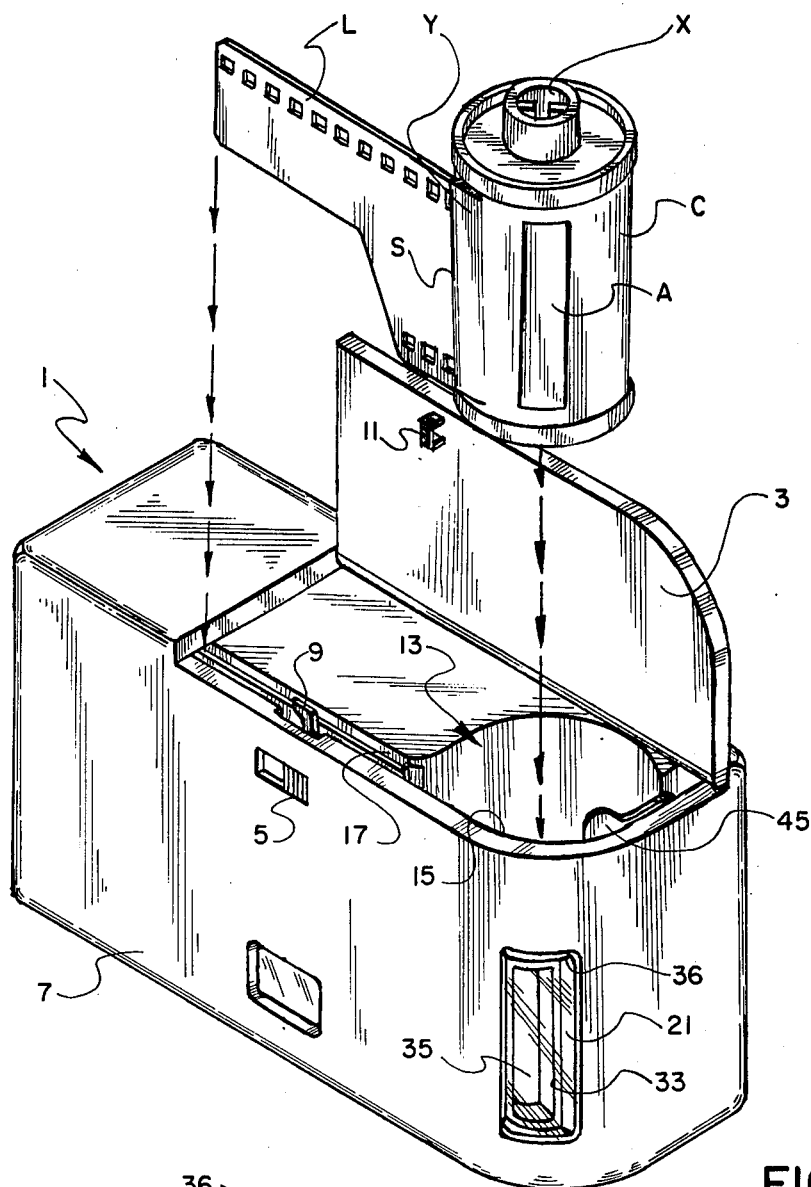
FIG. 1 is a rear perspective view of a 35 mm camera, shown bottom side up with a bottom door opened for cartridge-loading.

Referring now to the drawings, and in particular to FIG. 1, there is shown a bottom-loaded 35 mm camera adapted to receive a film cartridge C. The camera is depicted upside down to best illustrate the manner in which the film cartridge is loaded. The film cartridge C is a conventional one, including a rotatably mounted core member X, which supports a coiled 35 mm filmstrip in the cartridge interior. The filmstrip has a leader section L extending out of a light-trapped slot S in a lipped portion Y of the cartridge. Preferably, the camera has a body 1 that includes a hinged bottom door 3. An exterior slide button 5 on a back side 7 of the camera body 1 is fixed to a latching element 9, which engages a latched element 11 on the inside of the bottom door 3 to hold the door closed as the slide button is moved to the left in FIG. 1. Conversely, the latching element 9 separates from the latched element 11 to release the bottom door 3 as the slide button is moved to the right. Then, as illustrated in FIG. 1, the door 3 may be swung open to uncover a loading chamber 13, defined by a well 15 for receiving the film cartridge C, endwise, and by a slot 17 for receiving the extending leader section L, longitudinal edge first.

As shown in FIG. 2, a pressure plate 19 extends parallel to the leader-receiving slot 17 and is spring-supported on the inside of the camera back 7, in order to hold film advanced out of the loaded cartridge in an exposure plane during picture-taking. Suitable means, operated by movement of the slide button 5, may be provided for retracting the pressure plate 19 from adjacent the leader-receiving slot 17 to facilitate receipt of the film leader L in the slot as the cartridge is loaded in the well 15. Such a means, although not shown, is disclosed in U.S. patent application Ser. No. 355,789, more fully referenced above. A window 21 in the back side 7 of the camera body 1 is located opposite the cartridge-receiving well 15, in order to view a film-related information area A on the loaded cartridge. Typically, the information area A includes the film type, the ASA and DIN numbers, and the maximum number of exposures, although other information, such as the expiration date of the film, may be included.

Figure 6:
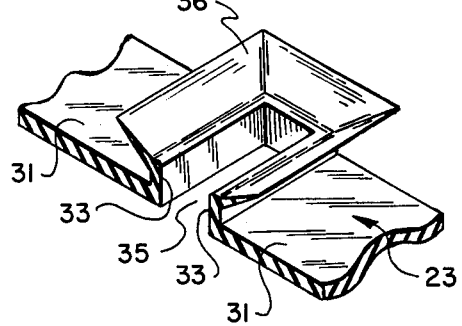
FIG. 6 is a partial perspective view of an elastic opaque strip, which is a component of the light shielding apparatus.
Figure 4:
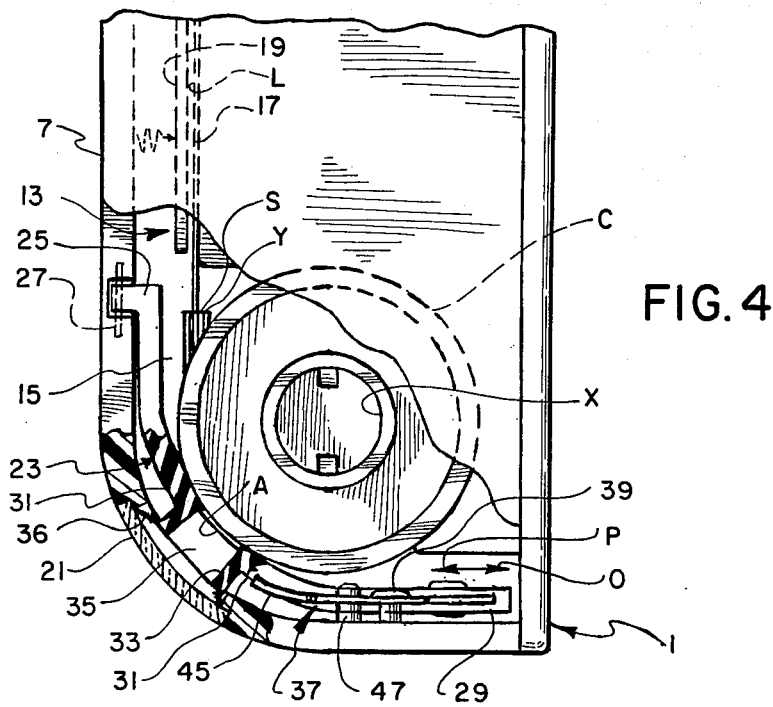
FIG. 4 is a bottom plan view of the light shielding apparatus, depicting the components of such apparatus in relative positions to prevent light entering a window in the camera back from reaching film advanced out of a loaded cartridge.

To prevent light entering the window 21 from spreading beyond the space between the window and the information area A, and fogging film advanced out of the loaded cartridge, there is included a flexible light-blocking member, preferably an elastic opaque strip 23, shown in FIGS. 2, 3 and 6. The opaque strip 23 has one end portion 25 fixed in contact with the inside of the camera back 7 by suitable means, such as a pin 27, at a location between the window 21 and the pressure plate 19, and another end portion 29 that is movable relative to the fixed end portion 25 in opposite directions O and P. An arcuate, intermediate portion 31 of the strip 23 is depicted, in FIG. 2, in a retracted or relaxed position, spaced from the cartridge-receiving well 15 to provide space for loading the cartridge in the well. A gasket-like frame 33 on the intermediate portion 31, in its retracted position, is located adjacent the window 21, and defines an opening 35 aligned with the window. A flared portion 36 of the frame 33 is fixed to the inside of the window 21, adjacent its edges, to tunnel light entering the window. If the movable end portion 29 is advanced in the direction O, the strip 23 will be pulled taut partially about the loaded cartridge to a tensioned position, shown in FIG. 4, causing the intermediate portion 31 to transversely shift against the cartridge and locate the opening 35 over the information area. The intermediate portion 31 and the fixed end portion 29 thus form a light-tight connection between the loaded cartridge and the inside of the camera back 7. Returning the movable end portion 29 in the direction P, the same distance it was advanced in the direction O, shifts the intermediate portion 31 back to its retracted position, shown in FIG. 2, whereby the light-tight connection with the cartridge is discontinued and the intermediate portion is spaced from the cartridge-receiving well 15 to facilitate removal of the cartridge from the well.

Figure 5:
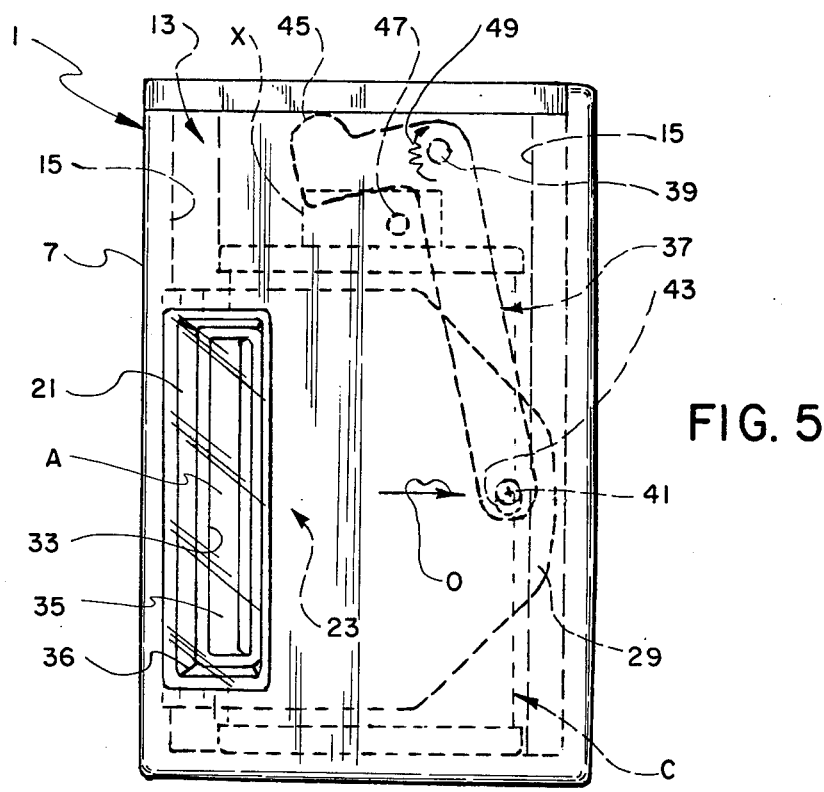
FIG. 5 is a side elevation view of the light shielding apparatus as depicted in FIG. 4.

To move the elastic strip 23 the same distance in the opposite directions O and P, there is included a lever 37 pivotally mounted, by a pin 39, on the inside of the camera body 1. The lever 37 is loosely coupled to the movable end portion 29 of the strip 23 by a pin 41 extending through an arcuate hole 43 in the movable end portion. When the bottom door 3 is manually closed, as shown in FIG. 5, it depresses a head member 45 of the lever 37, pivoting the lever counter-clockwise about the pin 39, away from a stop 47, to pull the movable end portion 29 of the strip 23 in the direction O and locate the strip in its tensioned position. Conversely, manually opening the bottom door 3, permits a return spring 49 to pivot the lever 37 clockwise about the pin 39, against the stop 47, to push the movable end portion 29 of the strip 23 in the direction P and locate its intermediate portion 31 in the retracted position. Although the movable end portion 23 is elastic and, therefore, would move from the tensioned position in the direction P by itself, the spring 49 operates to assure that the intermediate portion 31, in its retracted position, is sufficiently spaced from the loaded cartridge to facilitate its removal from the well 15.

The invention has been described in detail with reference to a preferred embodiment thereof, but it will be understood that variations and modifications can be effected within the spirit and scope of the invention. For example, instead of moving the end portion 29 of the strip 23 to effect a light-tight connection between the loaded cartridge and the camera back 7, the end portion 25 may be moved for such purpose.

I claim:

1. In a photographic camera adapted to receive a film cartridge having a film-related information area, the combination comprising:

a camera back having a window for viewing the information area;

means connected to said camera back for supporting film from the cartridge;

a light-blocking member, said member including a first portion secured to said camera back at a location between said window and said film supporting means and a second portion movable against the cartridge; and means for moving said second portion against the cartridge at a location between its information area and the film, whereby said light-blocking member connects said camera back and the cartridge to prevent light entering said window from reaching the film.

2. The combination as recited in claim 1, wherein said light-blocking member is an opaque strip.

3. In a photographic camera adapted to receive a film cartridge having a film-related information area, the combination comprising:
- a camera back having a window for viewing the information area;
- a flexible light-blocking strip, said strip including a first portion secured to the camera back and a second portion having an opening aligned with said window; and
- means supporting said strip for movement of its second portion relative to its first portion, partially against the cartridge, to position said opening over the information area and connect said camera back and the cartridge in light-confining relation, whereby light entering said window is prevented from reaching film advanced out of the cartridge.

4. In a photographic camera adapted to receive a film cartridge having a film-related information area and a light-trapped film slot, the combination comprising:
- a camera back having a window for viewing the information area;
- a pressure plate connected to said camera back for supporting film from the cartridge;
- a flexible light-blocking strip, said strip including a first fixed portion secured to said camera back at a location between said window and said pressure plate and a second movable portion; and
- manually operable means for moving said movable portion against the cartridge at a location between its information area and its film slot, whereby said strip connects said camera back and the cartridge to prevent light entering said window from reaching the film.

5. In a photographic camera adapted to receive a film cartridge having a film-related information area, the combination comprising:
- a camera back having a window for viewing the information area;
- a pressure plate connected to said camera back for supporting film from the cartridge;
- a flexible light-blocking strip, said strip including a fixed end portion secured to said camera back at a location between said window and said pressure plate and a movable elongate portion having an opening aligned with said window; and
- means for transversely moving said elongate portion against the cartridge to position said opening over the information area, whereby said light-blocking member connects said camera back and the cartridge to prevent light entering said window from reaching the film.

6. In a photographic camera adapted to receive a film cartridge having a film-related information area, the combination comprising:
- a camera back having a window for viewing the information area;
- a pressure plate connected to said camera back for supporting film from the cartridge;
- an elastic light-blocking strip, said strip including a fixed end portion secured to said camera back at a location between said window and said pressure plate, a movable end portion, and an elongate intermediate portion having an opening aligned with said window; and
- means for moving said movable end portion to draw said strip taut, partially about the cartridge, and transversely shift said intermediate portion against the cartridge to position said opening over the information area, whereby said strip connects said camera back and the cartridge to prevent light entering said window from reaching the film.

7. The combination as recited in claim 6, wherein said photographic camera has a bottom door that is opened to load the film cartridge in said camera and said moving means is coupled to said bottom door for moving said movable end portion of said strip upon opening said door.

* * * * *